United States Patent [19]

Van Deberg

[11] 4,027,759

[45] June 7, 1977

[54] GRAVITY CONVEYOR SYSTEM

[75] Inventor: Walter H. Van Deberg, Berkley, Mich.

[73] Assignee: F. Jos. Lamb Company, Warren, Mich.

[22] Filed: May 5, 1976

[21] Appl. No.: 683,631

[52] U.S. Cl. .............................. 193/1; 193/25 FT; 198/482; 198/492; 198/655

[51] Int. Cl.² .......................................... B65G 11/00

[58] Field of Search ............ 193/1, 2 R, 25 R, 25 A, 193/25 E, 25 AC, 25 C, 25 FT, 35 R, 35 C, 35 A, 35 F, 32, 38, 40, 41; 198/482, 492, 655, 797

[56] References Cited

UNITED STATES PATENTS

| 2,948,375 | 8/1960 | Dabich | 193/35 F |
| 3,168,177 | 2/1965 | Schuricht et al. | 193/25 FT |
| 3,967,712 | 7/1976 | Waitkins et al. | 193/25 FT X |

OTHER PUBLICATIONS

Wick, C. H., "Standardization", F. Joseph Lamb Co. Publication, Detroit, Michigan, 1960.

Primary Examiner—Johnny D. Cherry
Assistant Examiner—James L. Rowland
Attorney, Agent, or Firm—Barnes, Kisselle, Raisch & Choate

[57] ABSTRACT

A gravity conveyor system wherein headed workpieces are transported individually along a downwardly inclined chuting structure by supporting the workpieces on work carriers of the roller type. The workpieces are supported on arms journalled in and extending laterally from the work carrier rollers. A loading and unloading station are disclosed in which the power necessary for loading the workpieces onto the carriers and removing them from the carriers is supplied solely by the gravitational force acting on the carriers.

14 Claims, 11 Drawing Figures

FIG. 1

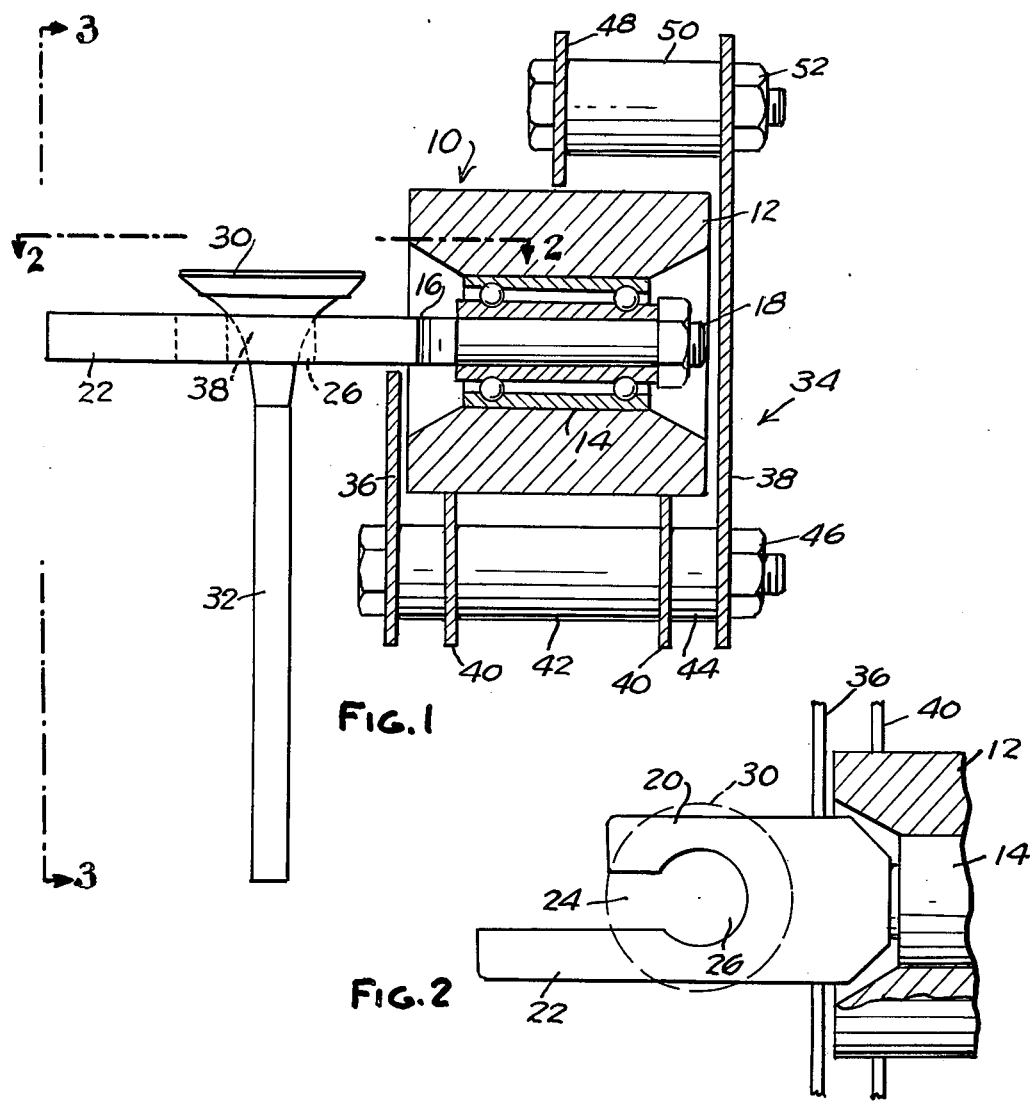
FIG.1
FIG.2
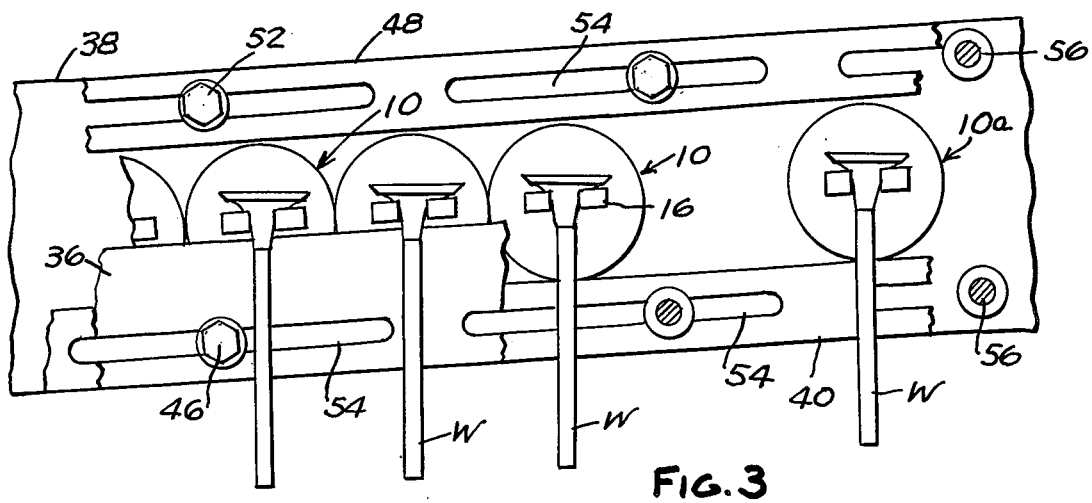
FIG.3

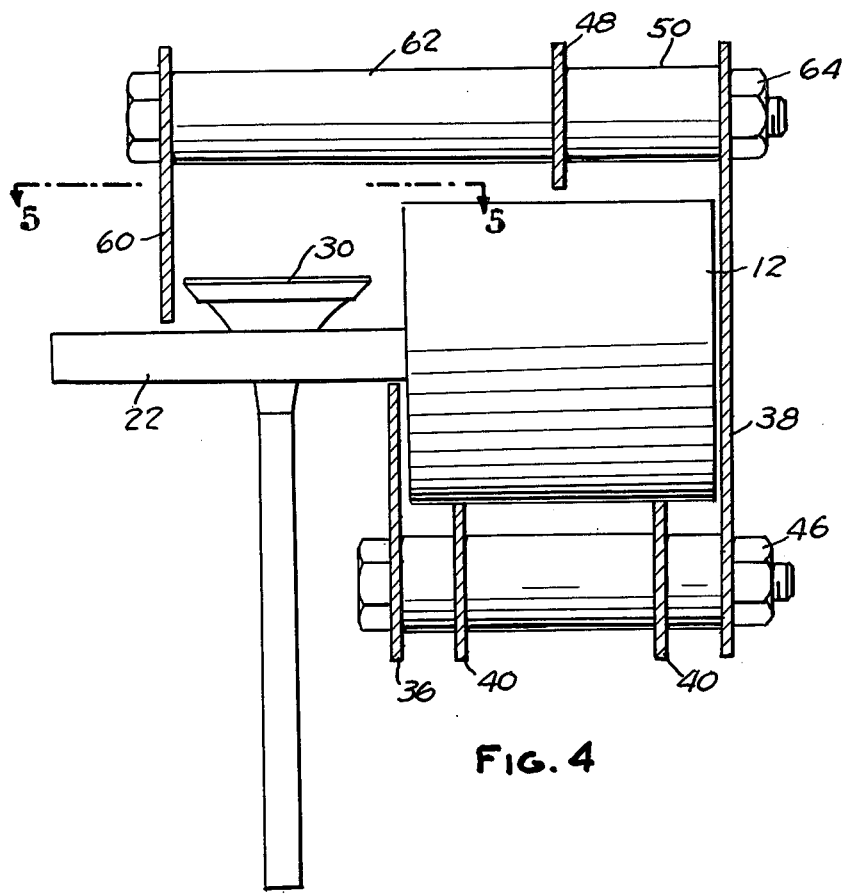
FIG. 4
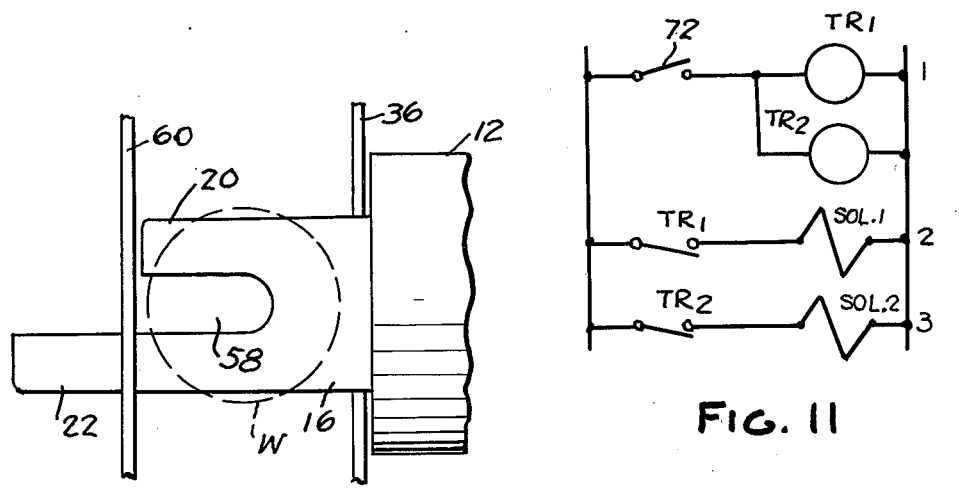
FIG. 5
FIG. 11

GRAVITY CONVEYOR SYSTEM

This invention relates to a gravity conveyor system for workpieces which must be handled individually. Conveyor systems of this invention are particularly suited to workpieces having a head at one end connected to a reduced neck or stem.

Many workpieces when conveyed between manufacturing operations must be handled individually. This is particularly true when the workpieces have been partially or wholly processed and cannot withstand rough handling. Any contact of the critical surfaces of the workpieces with each other or with the handling equipment may cause permanent damage or damage that is detrimental to further processing.

It has been common practice in the past when fragile workpieces were to be transported from work station to work station to place them in containers and hand carry or convey them by some other means. Frequently such containers were provided with dividers to prevent the workpieces from contacting one another. The expense and labor involved in this method of handling workpieces are excessive.

The present invention utilizes workpiece carriers of the roller type in combination with gravity chuting to transport the workpieces individually along a downwardly inclined path from station to station in a manner which fully protects them from damage. At the work-performing station the workpieces are automatically removed from the successive carriers by an unloaded mechanism so that a desired operation may be performed on the workpieces. The empty carrier then travels a short distance downstream and joins other empty carriers that are waiting at a loading station to receive the workpieces after the desired operation on them has been completed. As in other gravity conveyor systems, it is necessary to elevate the workpieces and carriers from time to time to regain the altitude lost by transporting them by gravity. It is also necessary at times to store the workpieces in suitable storage mechanisms to insure an adequate supply to satisfy the demands of certain machines performing operations thereon. The present invention is not directed to the elevating and storage mechanisms.

The workpiece carrier of this invention has an internal non-friction bearing that supports a bifurcated support arm that extends laterally from the carrier beyond the confines of the gravity chuting. The carrier arm is designed to support an individual workpiece in the slot provided by the bifurcation. The conveyor system of this invention also includes loading and unloading apparatus that places the workpieces into and removes them from the forked projection of the rolling carrier. The force that is generated by gravity on the rolling carriers furnishes the entire power required to perform the loading and unloading operations.

The primary object of this invention is to provide a conveying system of the gravity chuting type that is admirably suited for handling headed fragile workpieces.

It is another object of this invention to provide a conveying system for transporting workpieces individually in a manner such as to prevent the finished surfaces thereof from coming into contact with each other or into contact with the handling mechanism.

A further object of this invention is to provide loading and unloading mechanisms in a conveyor system of the type described which utilizes gravity as the sole source of power.

Further objects of this invention will become apparent from the following description and drawings, in which:

FIG. 1 is a cross sectional view through a conveyor system according to the present invention;

FIG. 2 is a view along line 2—2 in FIG. 1;

FIG. 3 is a view along line 3—3 in FIG. 1 showing several carriers and workpieces;

FIG. 4 is a view similar to FIG. 1 and showing an alternate construction of the chuting and carrier arm;

FIG. 5 is a sectional view along line 5—5 in FIG. 4;

FIG. 11 is an electrical diagram of a circuit for controlling the electrically actuated components at the loading station shown in FIG. 6.

Figure 7:
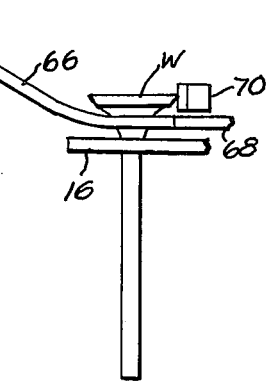
FIG. 7 is a view along line 7—7 in FIG. 6.

Referring to FIG. 1, the workpiece carrier is generally designated 10 and comprises a roller 12 having a cylindrical outer surface. Within roller 12 there is mounted along the central rolling axis thereof an anti-friction bearing 14 in which a carrier arm 16 is retained by a nut 18. The laterally extending portion of arm 16 comprises a short leg 20 and a longer leg 22 separated by a keyhole slot 24, the inner end of which is defined by an enlarged circular opening 26. As shown in the drawings, the top and bottom faces of legs 20,22 are flat.

A workpiece W is shown as a valve for an internal combustion engine. This workpiece was selected for illustration because it is fairly representative of the type of difficult parts that must be handled in modern manufacturing processes. The valve must be transported from one manufacturing operation to the next through the entire sequence of operations, and, as it progresses, more and more of its critical surfaces become vulnerable to permanent damage caused by contact with each other or by contact with the handling equipment. Workpiece W is shown carried by legs 20,22 and retained in the circular aperture 26 by engaging the tapered neck portion 28 on the underside of the head 30 of the valve which connects the head with the valve stem 32.

Carrier assembly 10 is adapted for rolling movement in a downwardly inclined chute assembly 34. Chute assembly 34 consists of laterally spaced guide rails 36, 38 and support rails 40 separated by spacers 42,44, all of which are secured together by a bolt and nut assembly 46. Carrier assembly 10 is retained within the chute formed by these rails by means of a retaining rail 48 located slightly above roller 12 and held in place by a spacer 50 and a nut and bolt assembly 52.

All of the above-described rails are preferably made of an alloy steel strip material that has been heat-treated to have the characteristics of a spring. This material is known in the steel industry as blue tempered strip spring steel. The temper of this steel renders it relatively hard and difficult to machine with conventional cutters. However, it can be readily pierced and sheared with common sheet metal tools. This preferred material is selected first for its ability to be hand-formed into smooth curves and secondly for its unique wearing and scuff-resisting qualities. It also has the advantage of being shop-prepared with holes and slots and then coiled for shipment to the construction site for assembly and erection of the chuting.

As shown in FIG. 3, all of these rails, with the exception of guide rail 38, have slots 54 pierced therethrough to accommodate the securing bolts. These longitudinally aligned slots are so placed that the distance between the adjacent extremities of each pair of slots is substantially less than the length of the slots so that, although the slots in the assembled rails may be staggered relative to the adjacent rails, the securing bolts may be inserted through the overlapping slots to match the regularly spaced holes 56 in guide rail 38. It will be appreciated that rail 38 can also have the slots formed therein rather than the regularly spaced round holes as shown. From the above description it is apparent that the chuting can be assembled without tightening the nuts and bolts so that it can be curved in erection to follow any desired tortuous path to conveniently reach the desired destination and then the nuts tightened to provide a rigid, permanent and relatively inflexible structure.

FIG. 3 shows chuting assembly 34 in a normal inclined installation where the force of gravity urges the successive carriers to roll down the incline. A stop mechanism (hereinafter described in connection with FIG. 6) arrests downward movement of the carriers shown in FIG. 3 in abutting relation. The upsteam carrier assembly 10A is shown rolling downwardly and its movement will be arrested when it contacts the next adjacent downstream carrier 10.

It will be noted that the diameter of rollers 12 is substantially greater than the diameter of head 30 of the valve. This prevents the valves from contacting one another. In addition, it will be noted that the carrier arms 16 are prevented from rotating with rollers 12 by the presence of the workpieces W with their heavy stemed ends upholding them in an upright orientation. However, even in the absence of a workpiece W, the support arms 16 are prevented from rotating and are maintained in a plane generally parallel to the supporting surface of rails 40 by the upper edge of guide rail 36 which is spaced in close proximity with the underside of arm 16.

The arrangement shown in FIGS. 4 and 5 differs only slightly from that shown in FIGS. 1 and 2. In the modified embodiment the keyhole slot 24 is replaced by a straight slot 58. The retaining function of the enlarged aperture 26 is performed by a workpiece retaining rail 60. Rail 60 is located by spacers 62,50 so that it extends parallel to the chuting along a line adjacent the laterally outer edges of the heads 30 of the workpieces. Rail 60 is mounted on rail 38 by a nut and bolt assembly 64. It will be apparent that, when the conveying system is transporting workpieces from operation to operation and the finished pieces are finally removed, the carrier assemblies will return empty by gravity to the starting point. Thus, at various portions along the system the carriers will be empty and there is no need for the retaining rail 60 at these portions. However, the upper edge of guide rail 36 will still maintain the carrier arms 16 in a plane generally parallel to the support surface of rails 40.

Figure 6:
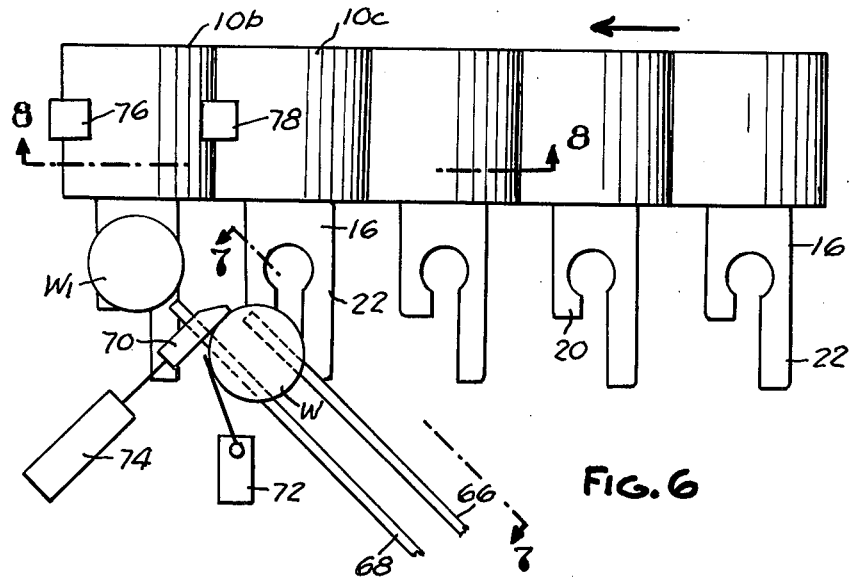
FIG. 6 is a diagrammatic plan view of a loading mechanism according to the present invention, the chuting structure for the carriers not being shown.
Figure 8:
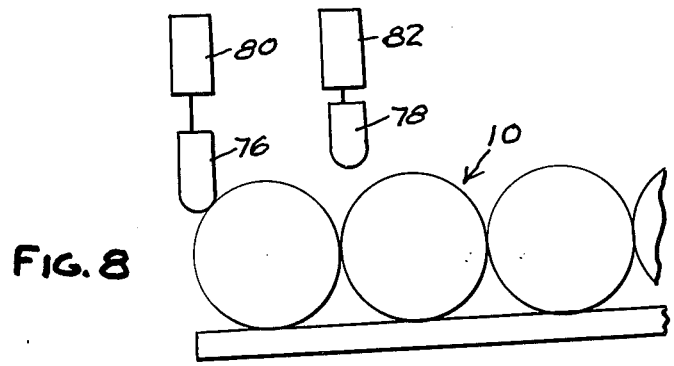
FIG. 8 is a view along line 8—8 in FIG. 6.

In FIGS. 6, 7 and 8 there is illustrated a preferred form of loading apparatus for the conveyor. This loading apparatus includes a pair of downwardly inclined support rails 66,68 which extend angularly toward the chuting assembly and terminate in short, generally horizontally disposed end portions on which the workpieces are retained at rest by a stop 70. As a workpiece approaches stop 70 it actuates a switch 72 which causes cylinder 74 to retract stop 70 and, at the same time, reverses the positions of stops 76,78 by actuating cylinders 80,82, as shown in FIG. 8. This action releases the previously loaded carrier assembly 10B and allows it to advance with workpiece W1 in a downstream direction. After a timed interval a signal commands cylinders 80,82 to return to their original position, thus allowing the train of empty carriers upstream to advance one increment of position. As the arm 16 of carrier 10C advances, the extended leg 22 thereof contacts the stem portion 32 of workpiece W at the loading station and cams it along the end portion of the longer rail 68 until the workpiece is released from rails 66,68 and deposited in the enlarged aperture 26 of the keyhole slot in the carrier arm. Carrier 10C will then gravitate to a position abutting stop 76. It will be appreciated that the force required to cam the workpiece onto the carrier arm is supplied not only by the gravitational force on carrier 10C, but also the gravitational force on the carriers upstream thereof. After a workpiece has been loaded stop 70 returns to the position shown in FIG. 6 and renders the loader ready for the next workpiece which will initiate another loading cycle.

A suitable circuit for operating the electrically actuated components illustrated in FIG. 6 is shown in FIG. 11. It is apparent from this diagram that, when switch 72 (line 1) is closed timers $TR_1$ and $TR_2$ are actuated. These two timers close switches $TR_1$ and $TR_2$ (lines 2 and 3). In turn, contacts $TR_1$ and $TR_2$ close solenoids 1 and 2. Solenoid 1 is in the valve controlling cylinder 74 and solenoid 2 is in the valve controlling cylinders 80,82. After a set predetermined time period which allows the escape of carrier 10B, timer $TR_2$ times out, thus releasing solenoid 2 and cylinders 80,82 will cause the stops 76,78 to again return to the positions shown in FIG. 8. When timer $TR_1$ times out it releases solenoid 1 and allows stop 70 to return to the position shown in FIG. 6 where it is ready to receive the next workpiece. Thus, as long as workpieces are supplied at rails 66,68 and there is a supply of empty carriers adjacent the loading station, the workpieces will be loaded on the successive carriers.

Figure 10:
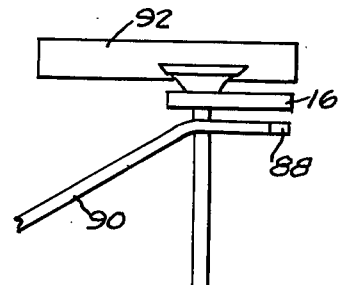
FIG. 10 is a view along line 10—10 in FIG. 9.
Figure 9:
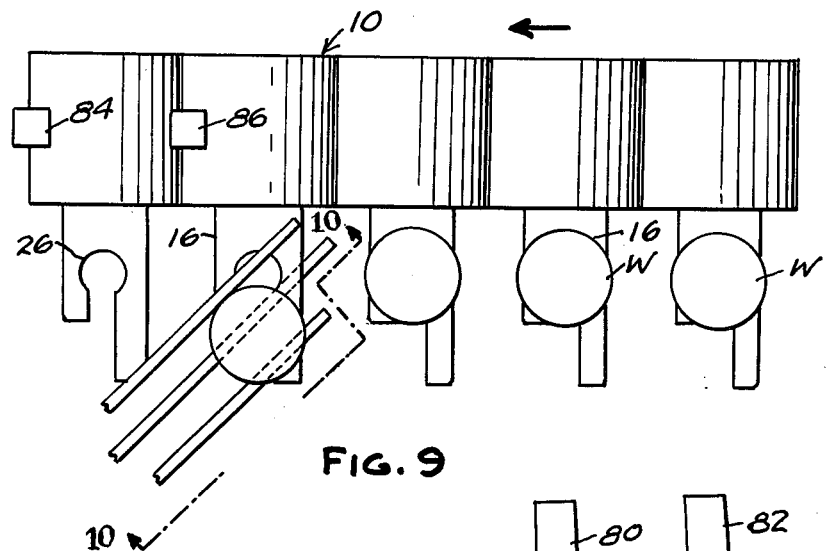
FIG. 9 is a diagrammatic plan view of an unloading mechanism according to the present invention.

In FIGS. 9 and 10 there is illustrated a preferred embodiment of the unloading mechanism of the present invention. In this arrangement stops 84,86 operate in substantially the same manner as stops 76,78 of the loading station shown in FIG. 6. However, stops 84,86 are controlled by a suitable switch which may be similar to swtich 72 and positioned to be closed as desired, such as by a loaded carrier 10 located directly adjacent the unloading station on the upstream side thereof. The unloading station includes a pair of downwardly inclined work support rails 88,90 having their upper horizontally disposed end portions located directly below the path of travel of the legs 20,22 of the carrier arms 16. A cam bar 92 is located directly above the path of travel of legs 20,22 and is disposed parallel to rails 88,90. When a workpiece W2 supported on the carrier arm comes in contact with the end portion of cam bar 92 it is partially cammed out of the keyhole slot in the arm to the position shown in FIGS. 9 and 10. At the beginning of the next cycle the workpiece will be urged completely free of arm 16 and will slide down the inclined rails 88,90.

I claim:

1. A conveying system for workpieces of the type having a head and a depending stem portion of narrower cross section than said head comprising, a downwardly inclined chute assembly through which work support carriers are adapted to roll by gravity, said chute assembly including means forming a downwardly inclined support surface and lateral guide surfaces for causing the work carriers to roll along a predetermined path, each work carrier comprising a roller having cylindrical outer surface supported by the support surface of the chute assembly for rolling movement thereon and having radially extending faces adapted to be engaged by the guide surfaces on the chute assembly to guide the roller laterally, means providing an anit-friction bearing on said roller at the central rolling axis thereof, and an arm supported by said bearing and being rotatable relative to said roller, said arm extending laterally outwardly at one end of said roller beyond said support and guide surfaces so that the arm laterally overhangs said chute assembly at one side thereof, the free end portion of said arm being apertured to receive the stem of a workpiece, said apertured end portion being adapted to engage the underside of the head of the workpiece with the stem thereof extending downwardly through said aperture so that the workpiece is supported in a vertically oriented position.

2. The combination called for in claim 1 including means on said work carriers for preventing the workpieces on successive carriers from contacting one another.

3. The combination called for in claim 1 wherein the rollers have a diameter at least slightly larger than the largest lateral dimension of the workpiece whereby, when the successive rollers are in tangential contacting relation, the workpieces supported thereby are spaced apart along said chute assembly in non-contacting relation.

4. The combination called for in claim 1 wherein the aperture in the end portion of said arm is defined by a bifurcation.

5. The combination called for in claim 1 wherein the free end portion of the arm comprises a fork having spaced apart legs extending parallel to the axis of the roller.

6. The combination called for in claim 5 including means for maintaining said arm in a position oriented such that said legs lie in a plane generally parallel to the plane of the laterally adjacent portion of the support surfaces.

7. The combination called for in claim 5 wherein the overhanging portion of the arm has a generally flat face portion lying in a plane parallel to the plane of said legs and means on said chute assembly engageable with said flat face on the arm for maintaining said legs in a plane generally parallel to the plane of the support surface.

8. The combination called for in claim 7 wherein said last-mentioned means comprises the means forming the guide surface on the chute assembly.

9. The combination called for in claim 7 wherein said means forming said guide surface comprises a vertically extending rail on one side of said chute assembly, said flat surface on said arm being disposed adjacent and above the upper edge of said guide rail.

10. The combination called for in claim 5 wherein the leg on the upstream side of the carrier is longer than the leg on the downstream side of the carrier.

11. The combination called for in claim 10 wherein the space between said legs defines a keyhole slot.

12. The combination called for in claim 1 including a guide rail on said chute assembly extending downwardly from above said rollers and terminating at its lower edge along a line spaced slightly above the plane of said arms and spaced laterally outwardly a distance such as to engage the laterally outer side of the workpiece supported on a carrier arm.

13. The combination called for in claim 5 including a loading station for said carrier comprising means for delivering successive workpieces in said vertically oriented position to a pick-up position disposed at said one side of said chute assembly and wherein the depending stem of the workpiece at said pick-up position is disposed in the path of travel of the longer leg of empty carrier located adjacent said pick-up position on the upstream side thereof, means for arresting downward rolling movement of a carrier on the downstream side of said pick-up position, sensing means adapted to be actuated by the presence of a workpiece at said pick-up position for actuating said movement arresting means to release said last-mentioned carrier and permit a carrier upstream therefrom to advance past said pick-up position, means at said pick-up position cooperating with said longer arm of the carrier for deflecting the workpiece at the pick-up position laterally onto the forked legs of the carrier advancing past the pick-up position.

14. The combination called for in claim 13 wherein said means for delivering workpieces to said pick-up position comprise a downwardly extending gravity chute, stop means for engaging the leading workpiece in said gravity chute and preventing movement thereof toward the row of carriers in the chute assembly beyond said pick-up position and means synchronized with the actuation of said movement arresting means for releasing said stop to permit successive workpieces in said gravity chute to be deflected onto the successive carriers advancing past the pick-up position.

* * * * *